United States Patent [19]

Schuster

[11] Patent Number: 4,821,977
[45] Date of Patent: Apr. 18, 1989

[54] FISHING REEL WITH TRIGGER ACTUATED BRAKE AND CLUTCH

[76] Inventor: Reinhold Schuster, Peter-Rosegger-Stasse 49, D-8039 Puchheim/Bahnhof, Fed. Rep. of Germany

[21] Appl. No.: 150,545

[22] Filed: Feb. 1, 1988

[30] Foreign Application Priority Data

Feb. 2, 1987 [DE] Fed. Rep. of Germany ... 8701557[U]

[51] Int. Cl.$^4$ .................... A01K 89/015; A01K 89/02
[52] U.S. Cl. .................... 242/220; 188/259; 242/84.42; 242/84.53; 242/217
[58] Field of Search ............. 242/84.1 R, 84.42, 212, 242/217, 218, 220, 221, 84.5 R, 84.5 A, 84.53, 216; 188/259

[56] References Cited

U.S. PATENT DOCUMENTS

| | | | |
|---|---|---|---|
| 941,201 | 11/1909 | Keller | 188/259 X |
| 2,399,863 | 5/1946 | Forestiere | 242/84.42 X |
| 2,535,584 | 12/1950 | Lorenz | 242/84.53 |
| 4,120,465 | 10/1978 | Noda | 242/219 X |
| 4,482,106 | 11/1984 | Kovalovsky | 242/221 X |
| 4,520,971 | 6/1985 | Nagata | 242/84.53 X |
| 4,640,471 | 2/1987 | Murakami et al. | 242/84.53 |

*Primary Examiner*—Joseph J. Hail, III

[57] ABSTRACT

A fishing reel has a line spool and related mechanism contained in a housing connected with a T-shaped foot for attaching the reel to a rod in a suspended position. A hand crank is drivingly connected with the spool through a driving mechanism including a clutch mechanism having a coupling member movable between a drive position at which the hand crank is drivingly connected with the spool and a free running position at which the driving connection between the hand crank and the spool is broken, thereby allowing the spool to rotate independently of the hand crank. A hand lever extending from the reel housing near the T-shaped foot is operable by a finger of the hand grasping the rod and operates when moved from its normal position to first move the coupling member to break the driving connection between the hand crank and the spool and to thereafter apply a friction brake to one flange of the spool to allow the angler to sensitively control the outward movement of the line and thereby the length of the cast.

8 Claims, 4 Drawing Sheets

FISHING REEL WITH TRIGGER ACTUATED BRAKE AND CLUTCH

BACKGROUND OF THE INVENTION

The invention concerns a fishing reel including a line spool rotatably supported on both sides of its flanges in a support frame and which through a drive mechanism stands in driving connection with a hand crank, and also including a coupling device with a clutch mechanism operable by means of a hand lever for selectively breaking the drive connection between the hand crank and the line spool.

Fishing reels of the above-described type are usually fastened to the fishing rod so that the fishing line runs from the line spool directly parallel to the rod. In use the fishing rod is generally so held that the reel is positioned upwardly. If the tackle is now to be cast, the angler takes a swing and at a given point in time presses with the thumb of the rod holding hand on a key-like hand lever to release the coupling, thereby freeing the line spool and therewith enabling the fishing line to run out without hindrance. In the course of this the angler controls the amount of runout line and thereby the distance of the cast by more or less braking the spool during the running out of the line by the thumb which operated the hand lever.

Also, fishing reels are known which are fastened to the fishing rod by means of a T-shaped foot and which, during use, hang below the rod. In the case of these fishing reels the spool is arranged with its shaft parallel to the rod. The line is wound onto or off of the spool through a line-catching bail rotatable around the spool. A possibilty also exists of folding back the bail and allowing the line to run off directly from the spool. In any event, upon the winding up and winding off of the line the bail is rotated. This hanging arrangement of the reel has certain advantages especially when large fish are to be caught and large tension forces are expected. On the other hand, the angler with these reels does not have the capability, upon the casting of the tackle, to influence the spool and therefore the cast by sensitively braking the spool in the same way as is the case with the previously described reel.

The invention has as its object the provision of a fishing reel wherein the advantages of both of the previously described types of fishing reels are combined in one reel.

SUMMARY OF THE INVENTION

In accordance with the invention the above object is solved in that the support frame or a housing surrounding it is fastened to a fishing rod by a T-shaped foot, in that the hand lever is arranged on the side of the reel carrying the T-shaped foot, and in that the reel has a brake mechanism operable by the hand lever for selectively braking the spool after breaking the driving connection between the spool and the hand crank.

The reel of the invention is likewise fastenable to a fishing rod in a suspended arrangement. Through a hand lever which extends from the reel in the direction toward the rod a finger of the hand which holds the rod upon casting at one time operates the clutch mechanism and thereby frees the spool and, as desired, thereafter operates the brake mechanism to influence the running of the spool and thereby the distance of the cast.

With the coupling mechanism, which includes a coupling element arranged coaxial to the spool shaft, connected to a drive pinion and axially shiftable between a drive position and a free running postition, and a slide with a ramp, which cooperates with an adjacent face connected to the coupling element to axially displace the coupling element, a brake mechanism may be combined in a simple manner using a two-armed operating lever pivotally supported on the support frame with one arm being linked to the hand lever and with the other arm being linked to the slide and also carrying a brake bow for engaging a given flange of the spool. By pivoting the operating lever the slide and with it the coupling element are first moved. After the release of the coupling the brake bow then moves into contact with the spool flange. This succession of movements is assured in that the joint between the slide and the operating lever lies between the pivot axis of the operating lever and the brake yoke. Therefore the joint between the operating lever, which has a pivotal movement, and the slide, which is shifted in the translation, can be formed in a simple way by a pin connected with one part (slide or operating lever) which engages with some play in a hole formed in the other part (operating lever or slide).

The brake bow consists preferably of an elastically deformable material and has a curved brake surface with a radius of curvature smaller than the opposed outside radius of the spool flange. Therefore, the ends of the brake bow first come into engagement with the spool flange. If the brake bow is further pivoted and thereby the braking force increased, the elastically deformable ends of the brake bow are pressed outwardly so that the brake surface engaging the spool flange is increased. To achieve a strong braking effect a brake lining with a high coefficient of friction can be arranged at a middle section between the ends of the bow. This brake lining then first engages with the spool flange when, with a correspondingly high braking force, the ends of the brake bow are so far bent outwardly that the radius of curvature of the braking surface corresponds to the external radius of the spool flange.

The hand lever is advantageously formed as a two-armed lever with unequal arms, the longer arm forming a grip portion and extending out from the support frame near the T-shaped foot so that it can be comfortably grasped by the hand holding the rod, while the shorter arm is connected with a return spring and also connected through a link with the operating lever.

A simple-to-manufacture and functionally reliable coupling mechanism is obtained in that the coupling element is freely rotatably supported in a yoke which on both sides of the spool shaft leads to a guide rod parallel to the spool shaft and which is spring biased to a position corresponding to the drive position of the coupling element, and in that the slide is fork-shaped with one of the fork legs carrying a ramp surface slidable under the yoke. The slide is advantageously spring biased to its rest position corresponding to the drive position of the coupling element which can be accomplished, for example, by the return spring engaging the hand lever.

The slide in the free running position of the coupling element can be latched in a corresponding release position so that it is releasably held in such position against a self-motivated return movement. Release from this latched position can therefore take place in that the hand crank stands in drive connection with a follower which, upon rotation of the hand crank, engages and releases the slide from its latched position. As the angler therefore turns the crank further the slide springs back to its rest position so that the drive connection between the line spool and the hand crank is again established.

Further advantages and features of the invention are apparent from the following description, which in conection with the accompanying drawings explain the invention by way of an exemplary embodiment.

DESCRIPTION OF THE PREFERRED EMBODIMENT

Figure 1:
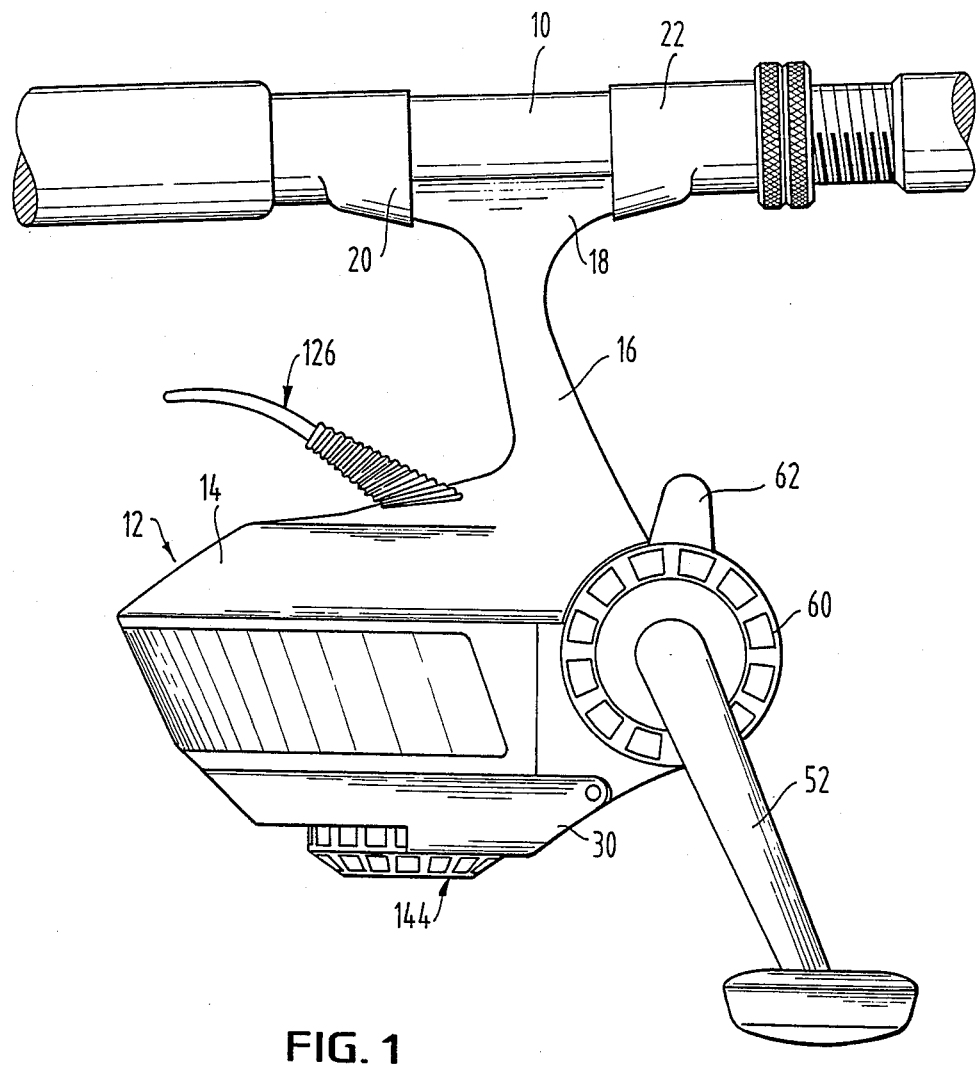
FIG. 1 a schematic side view of a fishing reel according to the invention along with a portion of the fishing rod to which it is connected, FIG. 2 a fragmentary sectional view of the fishing reel of FIG. 1 taken on a sectional plane perpendicular to the crank axis, FIG. 3 a plan view of the drive and coupling apparatus of the reel of FIG. 1 taken in the direction of the spool axis and with the housing being illustrated schematically, FIG. 4 a schematic fragmentary side view of the drive mechanism of the reel of FIG. 1 with the housing illustrated schematically, and FIGS. 5a to 5c schematic representations for explaining the effect of the brake bow upon actuation of a hand lever connected with the coupling mechanism and the brake mechanism.

In FIG. 1 is seen a section of a fishing rod, indicated generally at 10, onto which is fastened a fishing reel indicated generally at 12. The housing 14 of the reel is connected with a T-shaped foot 16, the T crossbar 18 of which lies against the rod 10 and is fastened to it in a known manner by two tubular bushings 20, 22.

A line spool 32, bounded by spool flanges 34, is freely rotatably supported on one side by a support plate 24 formed of one piece with the rest of the housing and on the other side by a support plate 26 fastened by screws 28 to a liftable housing cover 30. A coupling sleeve 38 is axially shiftably supported on a section of the spool shaft 36 on the side thereof adjacent the support plate 24, which sleeve carries an inclined tooth pinion 40 The coupling sleeve 38 is drivingly connectable with the spool shaft 36 through a four-cornered section of the spool shaft shown at 42 in FIG. 2. If the coupling sleeve 38 is moved in the axial direction away from the line spool 32 it disconnects from the four-cornered section 42 and thereafter the coupling sleeve 38 and the spool 32 are freely rotatable relative to one another.

The pinion 40 engages an intermediate gear wheel 44 consisting of an inclined toothed spur gear 46 and a bevel gear 48 formed as one piece with the spur gear 46. The intermediate wheel 44 is freely rotatably supported in the support plate 24 and housing 14 of the reel 12. The bevel gear 48 engages with a spur gear 50 (FIG. 3) which is freely rotatably supported on a shaft 54 connected with a hand crank 52. Brake disk sets 56, 58 are arranged on both sides of the spur gear 50, are located on the shaft 54, are axially shiftable and yet are rotatably fixed to the shaft 54. By turning an adjustment wheel 60 arranged coaxial to the shaft 54 the brake disk packets 56 and 58 can be so pressed together in the axial direction that they drive the spur gear 50 with more or less slip or also without any slip. Such type of friction brake for the line spool drive is in itself known and is therefore not explained in more detail. The same goes for a lever 62 rotatable about the axis of the shaft 54 and through the turning of which the brake effect of the friction brake formed by the brake disk packets 56 and 58 can be switched in or out independently of the set braking force. Since this mechanism likewise is already known it is not explained further here.

Figure 4:
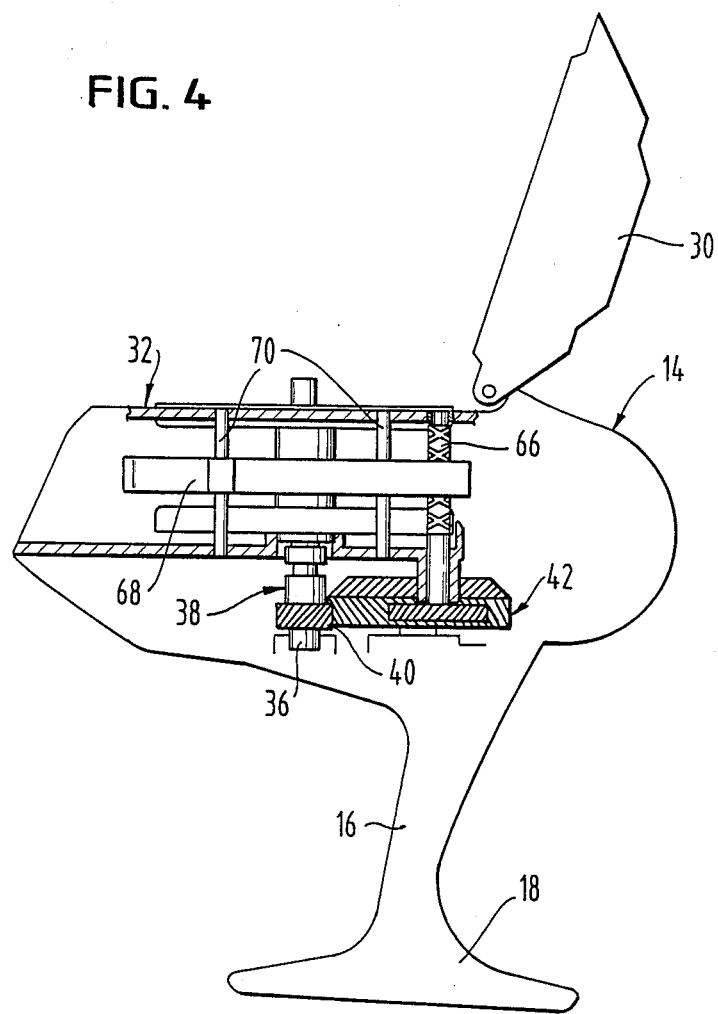

Another pinion 64 meshes with the spur gear 46 of the intermediate wheel 44, which pinion 64 is connected with a cross-thread spindle 66 (FIG. 4). This moves a line guide bow 68 back and forth, the bow being slidably guided on two guide rods 70 parallel to the spool shaft and carrying on its end remote from the cross-thread spindle 66 a line guiding eye 72. The line guide bow 68 provides by its back and forth movement, upon operation of the hand crank 52, for an even winding of the line onto the spool.

Figure 3:
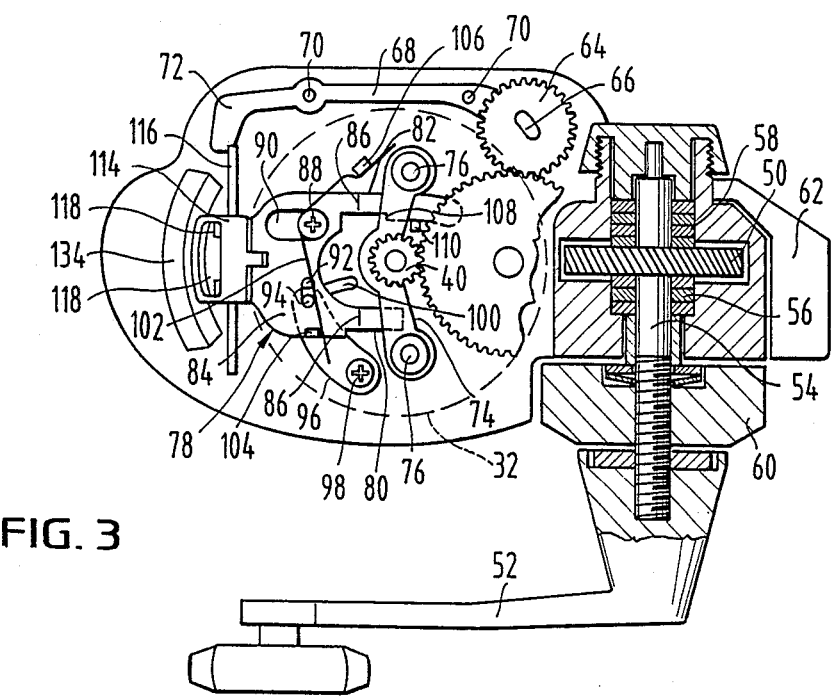

The coupling sleeve 38 is freely rotatably supported in a slot in a flat guide yoke 74 which at its ends is slidably guided on guide rods 76 parallel to the spool shaft and which is urged in the direction toward the support plate 24 by non-illustrated springs. A flat, fork-shaped slide 78, which extends with both of its fork legs 80, 82 under the guide yoke 74 on both sides of the line spool 36 serves to axially shift the guide yoke 74 and with it the coupling sleeve 38. The forked legs 80 and 82 are so bent at an angle relative to the main section 84 of the slide 78 to which they are connected that each leg has a ramp surface, indicated at 86 in FIG. 3, having the effect that the guide yoke 74 is pushed in the axial direction when the slide 78 is moved toward the right as seen in FIG. 3.

The slide 78 is guided on the support plate 24, by a bolt 88, for translational movement, the bolt 88 extending through an elongated opening 90 in the slide. At the same time, a pivotal movement of the slide about the axis of the bolt 88 is made possible in that an elongated opening 92 in the slide 78 receives a pin 94 fastened to a wing 96, which wing in turn is pivotally fastened to the support plate 24 by a screw 98 and which is guided in its pivotal movement about the axis of the screw 98 through a pin and elongated opening guide arrangement 100. This support for the slide 78 has the purpose of making possible a holding of the slide 78 in the position corresponding to the free running position of the coupling sleeve 38. In doing so the slide 78 pivots under the effect of a bow spring 102 which on one of its sides abuts a stop 104 fixed to the slide and on its other side abuts a stop 106 connected with the support plate 24, so that a detent surface 108 formed on the fork leg 82 snaps onto and behind a stop 110 connected to the support plate 24. From this latched position the slide is released when the hand crank 52 is operated, in which case a follower 112 (FIG. 2 connected with the intermediate wheel 44) strikes the fork leg 82 and pushes it away from the stop 110.

Figure 2:
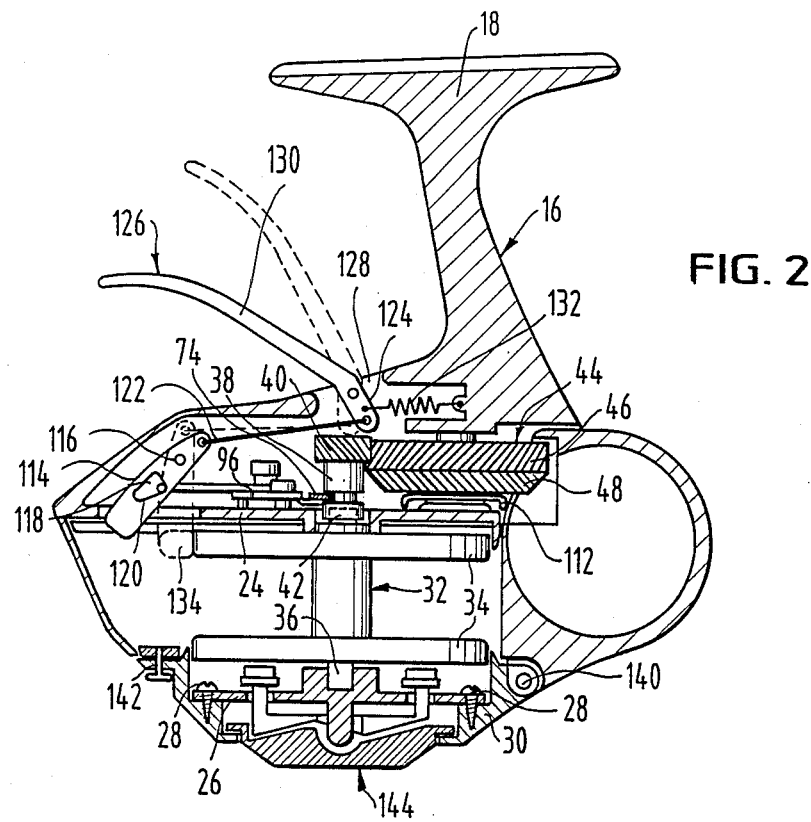

The actuation of the slide takes place through a two-armed operating lever 114 which is supported for pivotal movement relative to the housing 14 about a shaft 116. The operating lever 114 has a U-shaped profile with one leg of the U being seen in FIG. 2. The hinge connection between the operating lever 114 and the slide 78 results through pins 118 on the slide each of which is received in an associated triangular aperture 120 in a corresponding one of the U legs of the operating lever 114, as can be seen in FIGS. 2 and 3. The play provided by the shape of the apertures 120 permits the conversion of the pivotal movement of the operating lever 114 into a true translational movement of the slide 78. The opposite lever arm of the operating lever 114 is connected through a link 122 with the short lever arm 124 of a hand lever 126 which is pivotally supported in an opening 128 of the housing side facing the T-shaped foot 16 and which hand lever extends with its longer lever arm 130 so far out of the housing 14 that it can be comfortably actuated with a finger of the hand grasping the rod 10 and moved in the direction toward the rod 10. In this way, as seen in FIG. 2, the operating lever 114 is pivoted about its axis 116. The return of the hand lever 26 and with it also the return of the slide 78 takes place throught the agency of a return spring 132 which on one side is received by the housing 14 and on the other side is received by the short lever arm 124 of the hand lever 126.

Figure 5A:
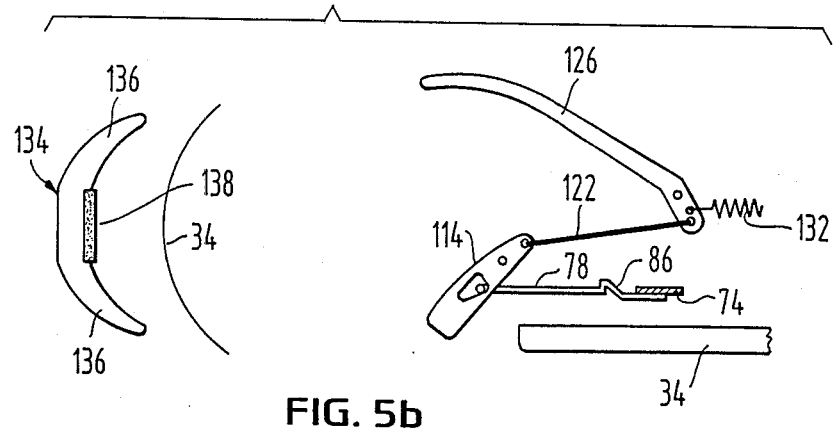
Figure 5B:
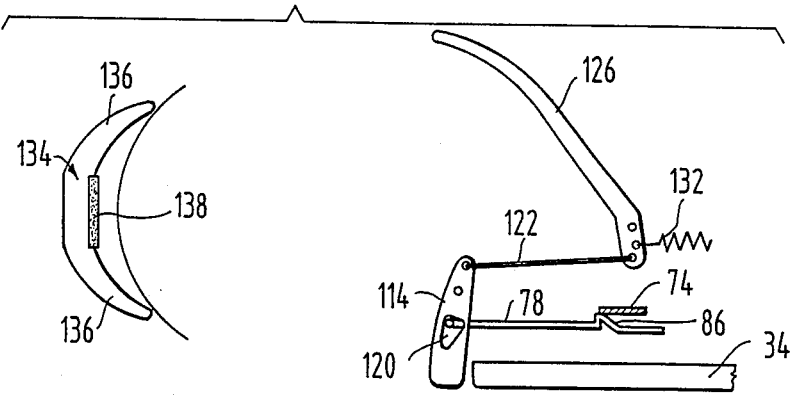
Figure 5C:
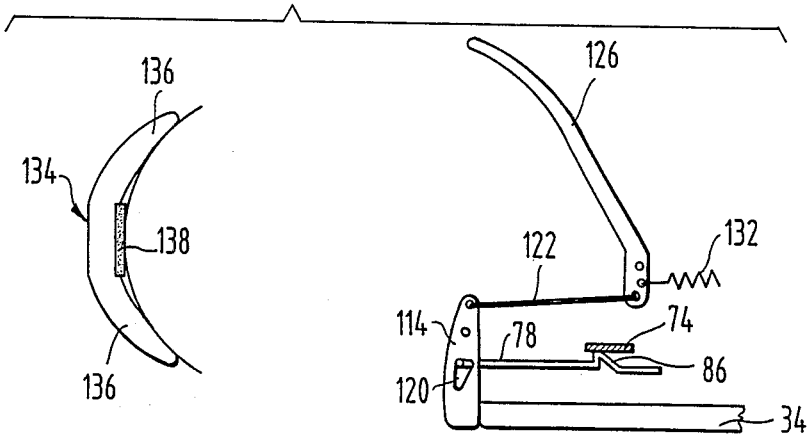

The end of the operating lever 114 extending toward the spool 32 carries a brake bow 134 designed to engage the outer circumferential surface of one of the spool flanges 34 (see FIGS. 2 and 5). The brake surface 136 of the brake bow 134 directed toward the spool flange has a smaller radius of curvature than the outer radius of the spool flange 34. The brake bow 134 consists of an elastic material and in the case of a high brake pressure suits itself to the outer radius of the spool flange 34, so that in the case of maximum brake pressure a brake lining 138 with a high coefficient of friction and located in the middle of the brake bow between the ends of the bow comes into engagement with the outer circumferential surface of the associated spool flange 34. FIGS. 5a to 5c show different positions of the brake bow relative to the spool flange and the corresponding positions of the hand lever 126. From this it can be seen that upon pivoting of the hand lever 126 in the direction toward the rod 10 the slide 78 first moves under the guide bow 78 and shifts the coupling sleeve 38 axially until the drive connection between the hand crank 52 and the spool 32 is released. Thereupon the detent surface 108 on the fork leg 82 snaps behind the fixed stop 110. Then upon further pivoting of the hand lever 126 in the direction toward the rod the brake bow 134 comes for the first time into engagement with the outer circumferential surface of the spool flange 34 so that now the rotational movement of the spool 32 during the running out of the line can be sensitively braked.

Upon releasing the hand lever 126 it is pivoted in the reverse direction by the return spring 132 to the extent allowed by the play in the hinge connection between the slide 78 and the operating lever 114 or the detent connection 108, 110. If the detent connection 108, 110 is released by rotation of the crank 52 then the slide 78 and the hand lever 126 return back to their initial position. The positive rotational connection between the hand crank 52 and the line spool 32 is thereupon re-established.

The housing cover 30 is pivotal about a pivot axis 140 parallel to the crank shaft 54 and is held in its closed position by a schematically illustrated latch 142. It contains an adjustable magnetic brake 144, known by itself, which serves to avoid an over rotation of the line spool 32 in free running when the line spool 32 is not braked by the brake bow 134. Upon opening of the cover 30 the line spool 32 can be removed and exchanged for another one.

I claim:

1. A fishing reel comprising: a support frame, a line spool having a shaft and two flanges spaced from one another along the length of said shaft, said flanges each having an inward face facing the other of said flanges and each having an outward face facing away from the other of said flanges, means engaging and supporting said spool shaft outwardly of the outer face of each of said flanges for rotation relative to said support frame, a hand crank rotatably carried by said support frame, a hand lever pivotally carried by said support frame, a drive mechanism for drivingly connecting said hand crank to said spool, and a coupling mechanism associated with said drive mechanism and including a release mechanism operable by said hand lever for selectively breaking the driving connection provided by said drive mechanism between said hand crank and said line spool, said support frame having a T-shaped foot for fastening the reel to a rod, said hand lever being arranged near said T-shaped foot so as to be operable by the same hand of a user as holds the rod to which said reel is fastened, and a brake mechanism operable through said hand lever for selectively braking said line spool after the breaking of said driving connection between said line spool and said hand crank, said coupling mechanism including a coupling element arranged coaxially with said spool shaft, which coupling element is connected with a drive pinion and is axially shiftable between a drive position and a free running position, said coupling mechanism also including a slide with a ramp which ramp is cooperable with a surface connected with said coupling element for axially shifting said coupling element, and a two-armed operating lever supported on said support frame for pivotal movement, said operating lever having a first arm linked to said hand lever and a second arm linked to said slide, said second arm of said operating lever also carrying a bow shaped brake element as part of said brake mechanism and designed to engage one of said flanges of said spool, said hand lever being a two-armed lever with a longer arm and a shorter arm, said longer arm being a grip portion which extends out of said support frame near said T-shaped foot and said shorter arm being connected with a return spring and also being connected through a link with said operating lever.

2. A fishing reel according to claim 1 further characterized by said coupling element being freely rotatably supported in a yoke which on both sides of said spool shaft is guided on a guide rod parallel to said spool shaft, means urging said yoke toward a position corresponding to said drive position of said coupling element, and said slide being fork shaped with two legs each having a ramp surface slidable under said yoke.

3. A fishing reel according to claim 1 further characterized by means urging said slide toward a rest position corresponding to said drive position of said coupling element.

4. A fishing rod according to claim 3 further characterized by means for latching said slide in a release position corresponding to said free running position of said coupling element so that said slide is held against a self-motivated return to said rest position, and a follower standing in driving connection with said hand crank for releasing said slide from said release position.

5. A fishing rod according to claim 1 further characterized by a joint between said slide and said operating lever which joint lies between the pivot axis of said operating lever and said brake element and which joint includes a hole formed in one of said slide and operating lever and a pin on the other of said slide and operating lever which fits into said hole with play.

6. A fishing rod according to claim 1 further characterized by said brake element consisting of an elastically deformable material and having a curved brake surface with a radius of curvature smaller than the outer radius of the associated one of said spool flanges.

7. A fishing reel according to claim 6 further characterized by said brake element having two ends and a middle section and said middle section carrying a brake lining having a high coefficient of friction.

8. A fishing reel according to claim 1 further characterized by said support frame including a housing surrounding said spool and which housing includes a main portion with an opening and a cover hingedly connected to said main portion for movement between positions at which it respectively covers and uncovers said opening, said line spool at one end of said shaft being supported in a support piece connected to said housing cover and being removable from said housing through said opening.

* * * * *